United States Patent
Liang et al.

(10) Patent No.: US 6,876,579 B2
(45) Date of Patent: Apr. 5, 2005

(54) METHOD WRITING DATA TO A LARGE BLOCK OF A FLASH MEMORY CELL

(75) Inventors: Chu-Cheng Liang, Hsinchu Hsien (TW); Chee-Kong Awyong, Hsinshu Hsien (TW); Khein-Seng Pua, Hsinchu Hsien (TW)

(73) Assignee: Phison Electronics Corp., Hsinchu Hsien (TW)

( * ) Notice: Subject to any disclaimer, the term of this patent is extended or adjusted under 35 U.S.C. 154(b) by 4 days.

(21) Appl. No.: 10/632,927

(22) Filed: Aug. 4, 2003

(65) Prior Publication Data

US 2005/0030791 A1 Feb. 10, 2005

(51) Int. Cl.⁷ .............................................. G11C 16/04
(52) U.S. Cl. .............................. 365/185.11; 365/230.03
(58) Field of Search ....................... 365/185.11, 230.03, 365/230.08, 235

(56) References Cited

U.S. PATENT DOCUMENTS 6,058,047 A * 5/2000 Kikuchi .................. 365/185.33
6,754,115 B2 * 6/2004 Sugita ........................ 365/201

* cited by examiner

Primary Examiner—Michael S. Lebentritt
Assistant Examiner—Toan Le
(74) Attorney, Agent, or Firm—Bacon & Thomas PLLC

(57) ABSTRACT

A method of writing data to a large block of a flash memory cell is disclosed. When the processor writes data to the flash memory cell, if the changed data can not fill up the whole page, the processor will pick a block from one of the backed up blocks in the flash memory cell using as a special block for storing changed data temporarily, and continue to write the next changed data into the special block until whole space in the page is filled up. When the page is completely filled, then the data stored temporarily in the special block is moved to a buffer of the backed up block and then the special block is erased so that it can be used as a back up block, thus when writing data to flash memory cell, even when the change of data is unable fully fill up the whole page, the changed data still can be written continuously, and therefore the writing speed can be substantially increased.

3 Claims, 6 Drawing Sheets

Block    Buffer    Special block

Block    Buffer    Special block

METHOD WRITING DATA TO A LARGE BLOCK OF A FLASH MEMORY CELL

BACKGROUND OF THE INVENTION

1. The field of the invention

The present invention relates to a method of writing data to a large block of a flash memory cell, and more particularly relates to a method of writing data to a large block of a flash memory cell in which the data can be written continuously to a page even when the change of data is unable fully fill up the whole page.

2. Description of the Related Art

As the demand for NAND flash memory cell in the market is increasing, the productivity and the process technology are also upgraded accordingly, such as the development of new type of NAND flash memory cell, for example, a large block flash memory cell, a MLC flash memory cell and the like. And as technology is improved, the unit price of the flash memory cell is getting lower and lower. However, during the operation, the data storage or data retrieval of each page of the flash memory cell can be implemented only once at a time, and writing the data to the flash memory cell is limited by a sequence of operation, thus the processing speed of writing data to the flash memory cell is obviously reduced correspondingly.

The method of storing and retrieving data from the NAND flash memory cell can be generally described as follows.

Referring to FIG. 1, the controller picks one block from the preset back up blocks in the flash memory cell and use it as a buffer 11, and writes the unchanged data into the block 12 of the flash memory cell from the first page of the block 12 in an orderly manner, page by page to the buffer 11.

Referring to FIG. 2, if the changed data in the block 12 is enough to fill up a whole page, then the data will be written into the buffer 11 page by page according to the page number.

Referring to FIG. 3, if the changed data in the block 12 is insufficient to fill up a whole page, the processor uses the data 13 of the original block 12 to fill up the remaining free space and write to the buffer 11.

Furthermore, referring to FIG. 4, writing the unchanged data below the changed data in the block 12 in an orderly manner, page by page to the buffer 11 until writing of data in of the all pages is completed, then the original block 12 is erased to serve as a back up block, and the original block 12 replaced by the buffer 11.

However, the above conventional data writing method can only move data from the original block to fill up the remaining free space when the space in the page is not completely filled up when data change occurs, and when the data is not written continuously, writing speed will be significantly slow. In an electronic device, such as a computer, which uses this type of flash memory cell, the calculation and processing speed will be significantly reduced.

SUMMARY OF THE INVENTION

Accordingly, in the view of the foregoing, the present inventor makes a detailed study of related art to evaluate and consider, and uses years of accumulated experience in this field, and through several experiments, to create a new method of writing data to the high speed large block of flash memory cell.

According to one major aspect of the present invention, when the processor writes data to the flash memory cell, if the changed data can not fill up the whole page, the processor will pick a block from one of the backed up blocks in the flash memory cell using as a special block for storing changed data temporarily, and continue to write the next changed data into the special block until whole space in the page is filled up. When the page is completely filled, then the data stored temporarily in the special block is moved to a buffer of the backed up block and then the special block is erased so that it can be used as a back up block, thus when writing data to flash memory cell, even when the change of data is unable fully fill up the whole page, the changed data still can be written continuously, and therefore the writing speed can be substantially increased.

BRIEF DESCRIPTION OF THE DRAWING

For a more complete understanding of the present invention, reference will now be made to the following detailed description of preferred embodiments taken in conjunction with the accompanying drawings, in which.

DETAILED DESCRIPTION OF PREFERRED EMBODIMENTS

Figure 1:
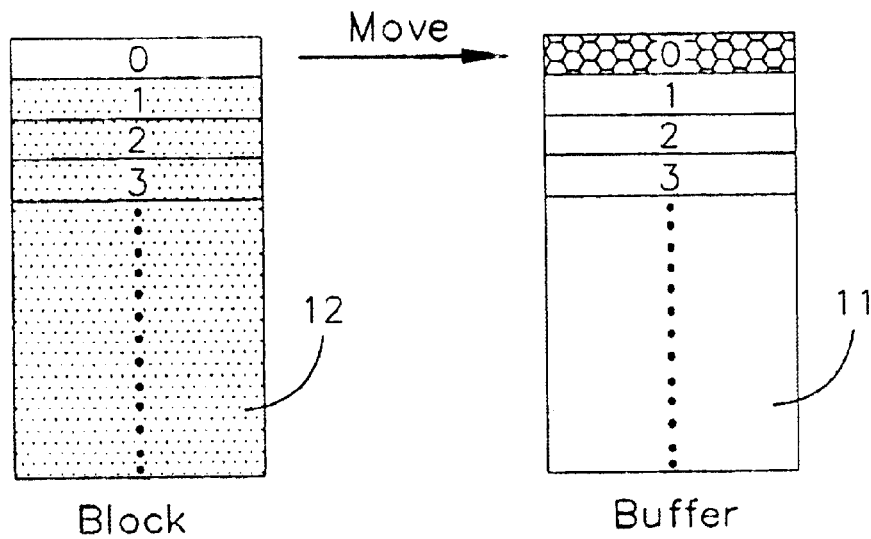
FIG. 1 is a block diagram (1) of a conventional data writing method.
Figure 2:
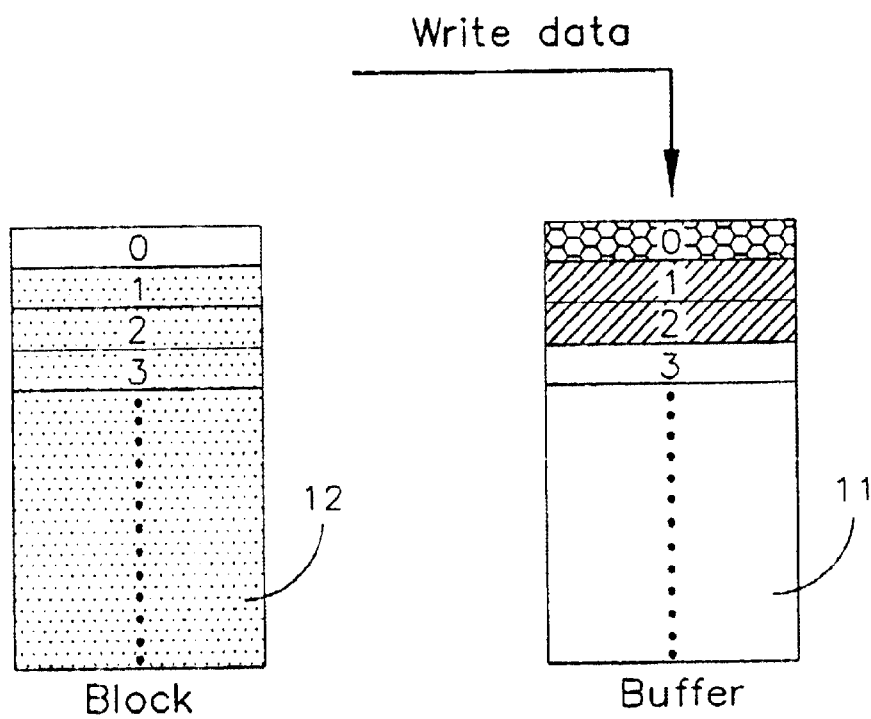
FIG. 2 is a block diagram (2) of the conventional data writing method.
Figure 3:
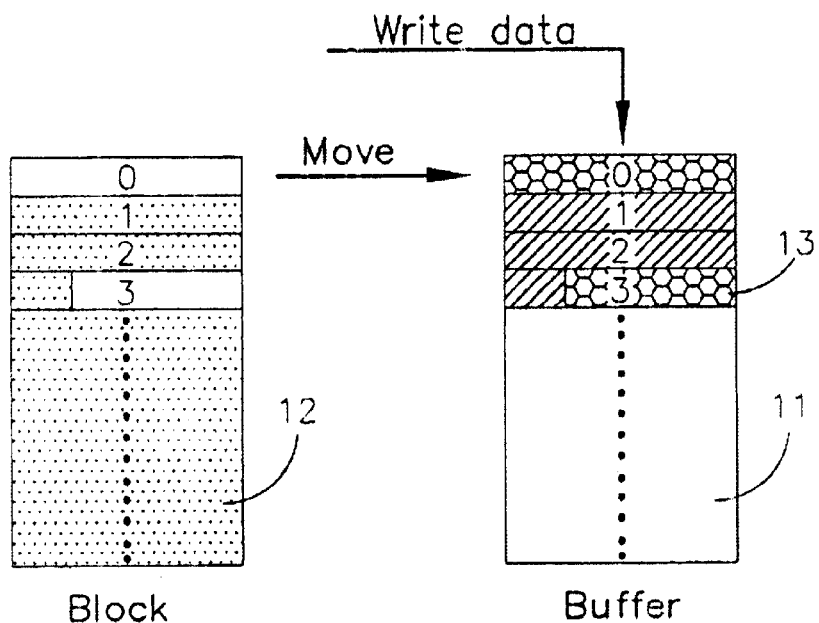
FIG. 3 is a block diagram (3) of the conventional data writing method.
Figure 4:
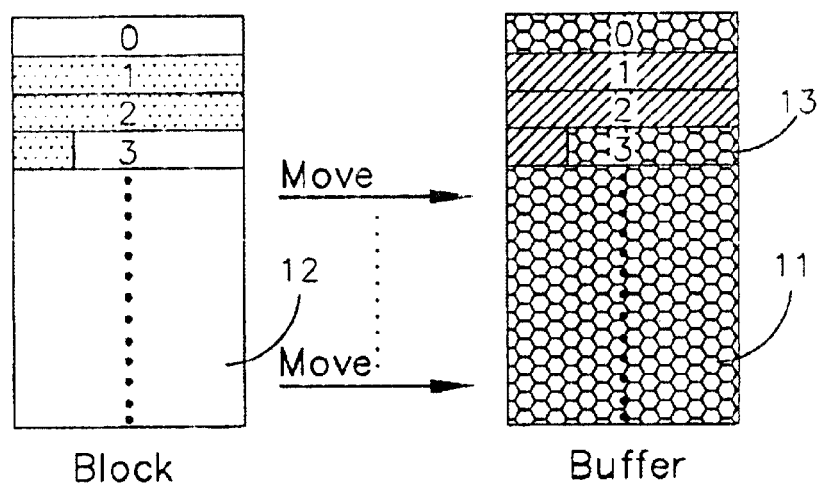
FIG. 4 is a block diagram (4) of the conventional data writing method.

Reference will be made in detail to the preferred embodiments of the invention, examples of which are illustrated in the accompanying drawings. Wherever possible, the same reference numbers are used in the drawings and the description to refer to the same or like parts.

The present invention relates to a method of writing data to the high speed large block of flash memory cell. When the processor writes data to the flash memory cell, if data changed is unable completely fill the page, the processor will pick a block from the back up blocks of the flash memory cell as the special block for writing the changed data into the special block for temporarily storage until the page is completely filled, and then the temporarily stored data from the special block is moved to one of the buffer of the back up block. Next, the special block is erased to serve as a back up block. Therefore, even when the changed data is unable to completely fill the page, the changed data can still be written continuously to substantially increase the writing speed.

Figure 5:
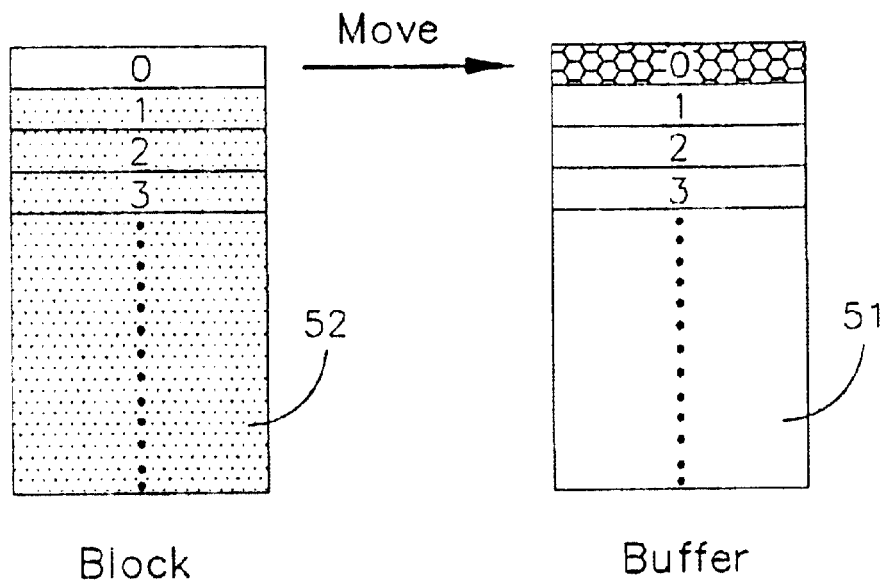
FIG. 5 is a block diagram (1) of a data writing method of the present invention.

In a preferred embodiment of the present invention, referring to FIG. 5, a block is picked to use as a buffer 51 from the preset back up blocks of the flash memory cell, and the unchanged data is written to the block 52 of the flash memory cell from the first page of the block 52 and the unchanged data is moved in an orderly manner according to the page numbers, page by page to the buffer 51.

Figure 6:
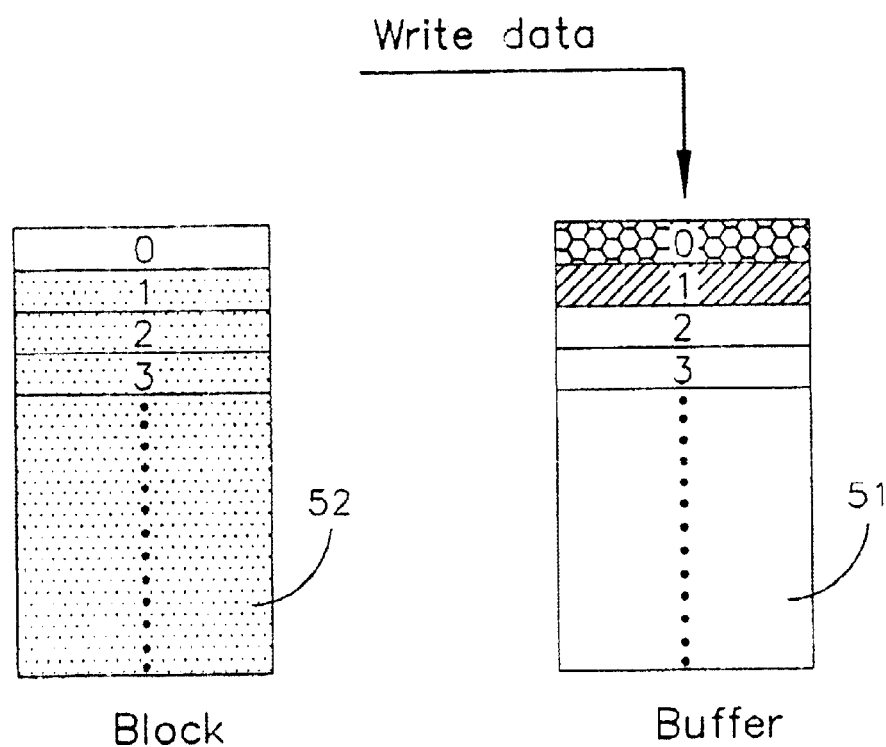
FIG. 6 is a block diagram (2) of the data writing method of the present invention.

Referring to FIG. 6, if the changed data in the block 52 is sufficient to completely fill a page, then the changed data is written page by page according to the page numbers to the buffer 51.

Figure 7:
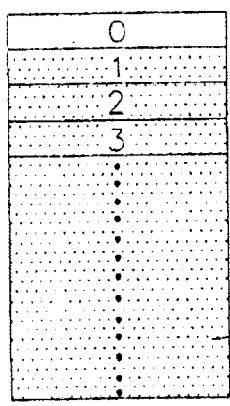
FIG. 7 is a block diagram (3) of the data writing method of the present invention.
Figure 7:
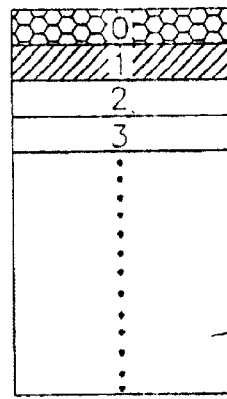
Figure 7:
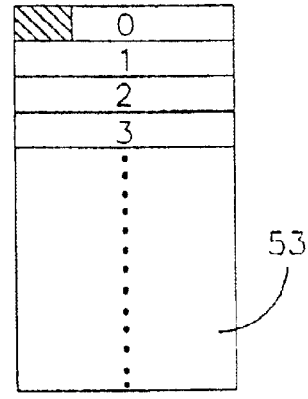

Furthermore, referring to FIG. 7, whether the changed data in the block 52 is insufficient to completely fill a page is judged, then a block is picked to serve as a special block 53 from the back up blocks and the changed data is written to the special block 53 for temporary storage.

Figure 8:
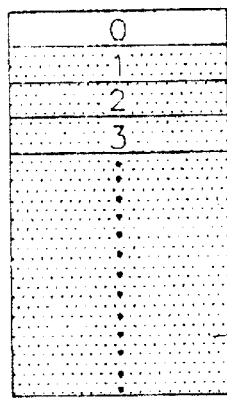
FIG. 8 is a block diagram (4) of the data writing method of the present invention.
Figure 8:
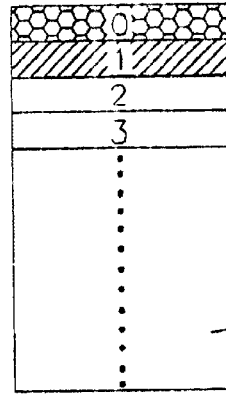
Figure 8:
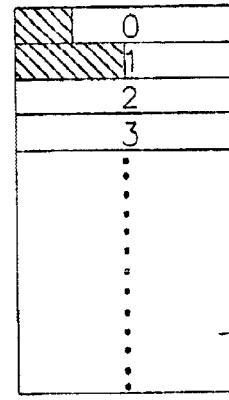
Figure 9:
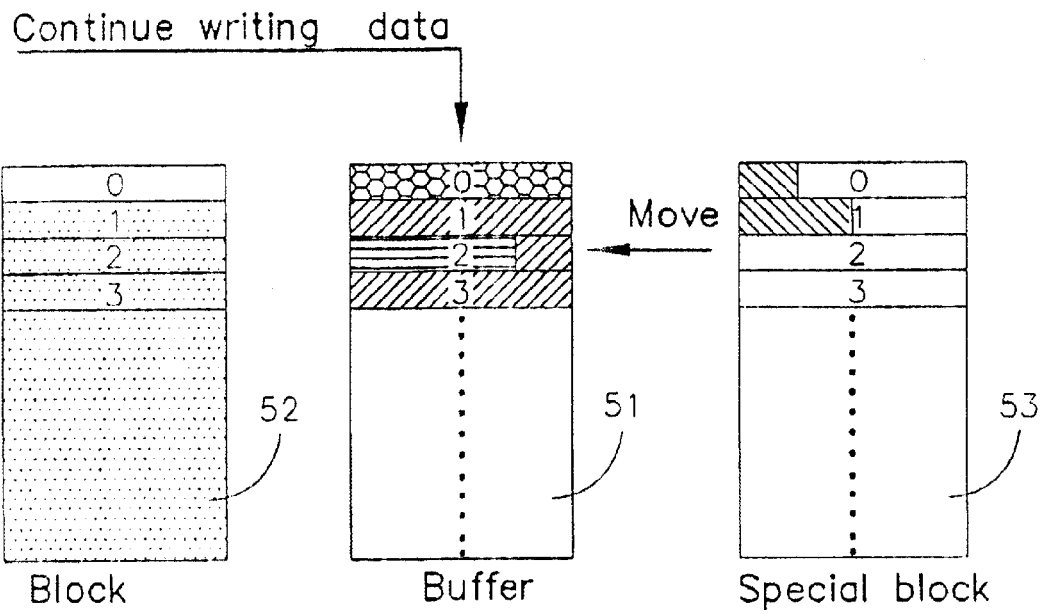
FIG. 9 is a block diagram (5) of the data writing method of the present invention.
Figure 10:
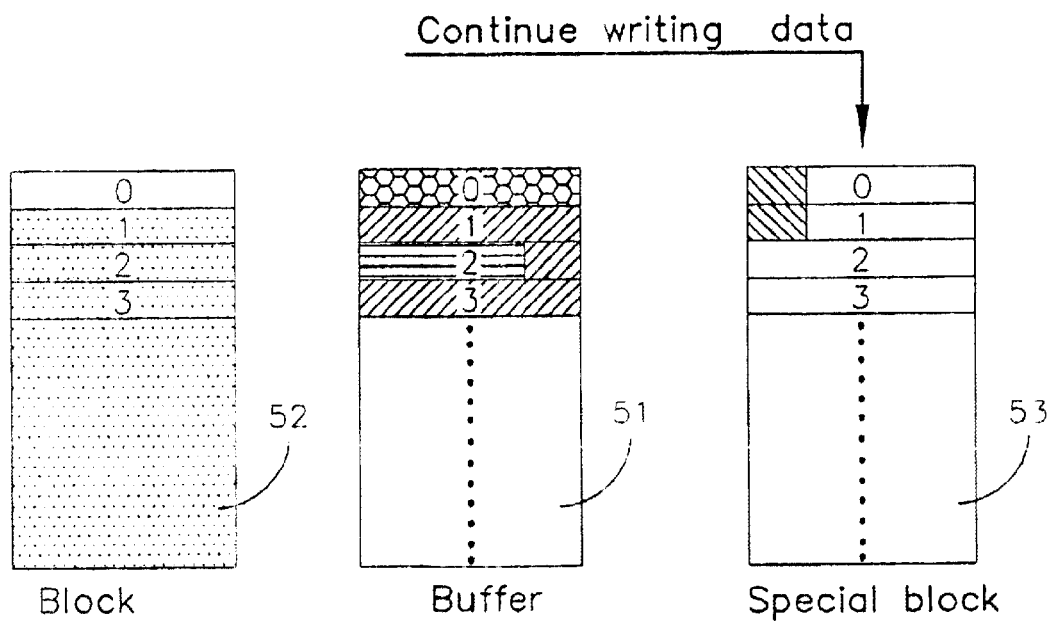
FIG. 10 is a block diagram (6) of the data writing method of the present invention.

Referring to FIGS. 8, 9 and 10, whether the next set of data is the continuation of the changed data is judged. If yes, then whether the set of data and the temporary data stored in the special block 53 is sufficient to completely fill the page is judged. If yes, the temporarily stored data is retrieved from the special block 53 and organized together with the set of data for filling up the page then written to the buffer 51, and then the special block 53 is erased for serving as a back up block. If not (i.e. if the set of data and the temporary data stored in the special block 53 is sufficient to completely fill the page), writing of the data to the special block 53 is continued, and the writing action will be repeated until the page is completely filled. When the page is completely full, then the temporary stored data is retrieved from the special block 53 and the set of data for filling up the page are organized and then the data is written to the buffer 51, and then the special block 53 is erased to serve as a back up block.

Figure 11:
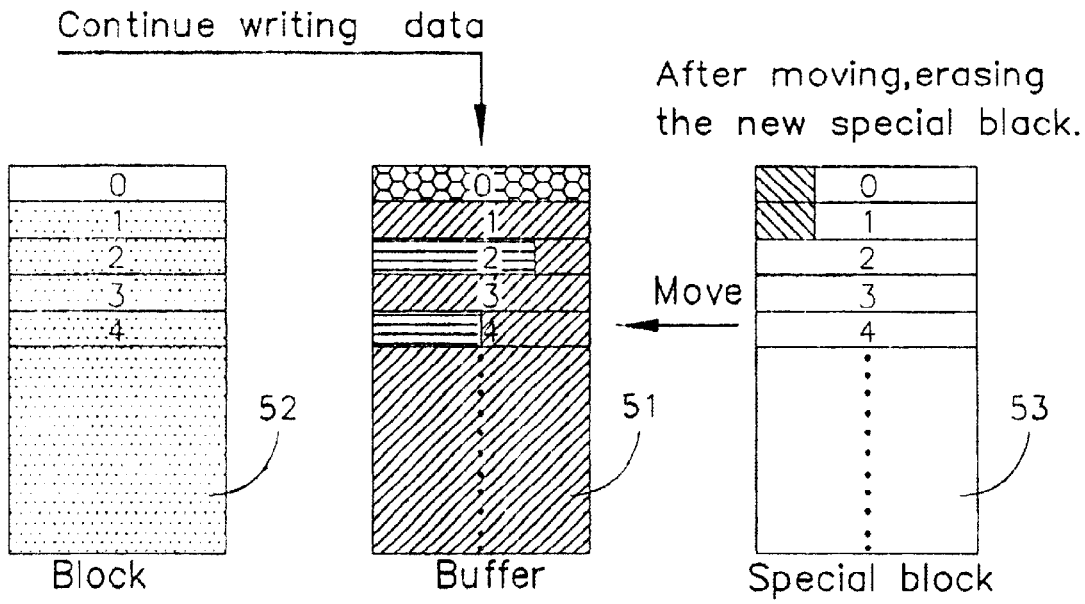
FIG. 11 is a block diagram (7) of the data writing method of the present invention.

Additionally, referring to FIG. 11, if the next set of data is a continuation of the changed data, the above procedure is repeated, writing the data page by page to the buffer 51 until the page is completely full, then the original block 52 is erased for serving as a back up block and the block 52 is replaced by the buffer 51 to repeat the above procedure.

Figure 12:
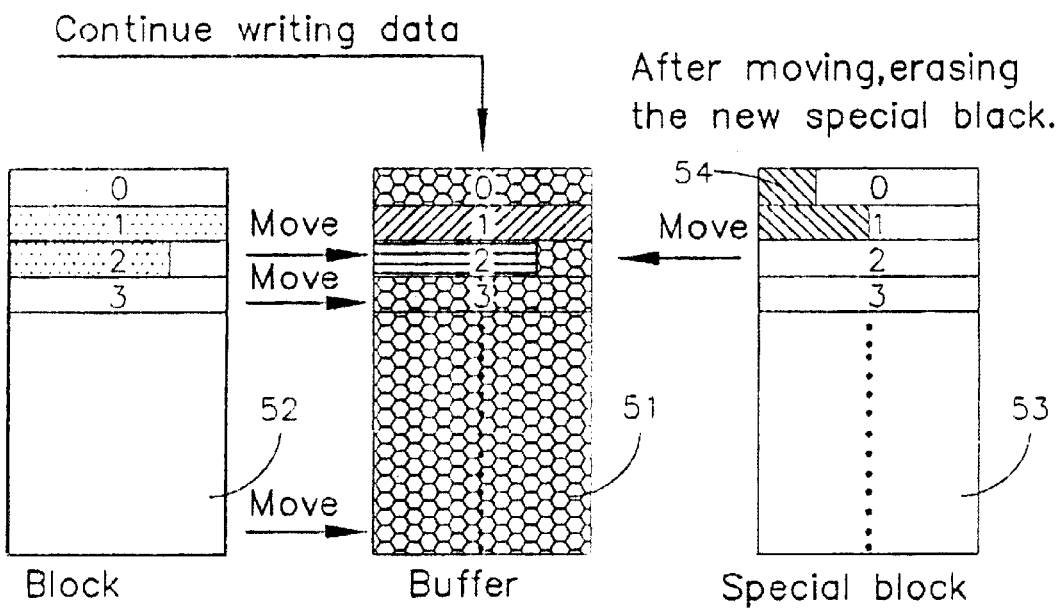
FIG. 12 is a block diagram (8) of the data writing method of the present invention.

Referring to FIG. 12, if the next set of data is not the continuation of the changed data, the stored data is read from the special block 53, and the changed data in the block 52 is organized to fill up the remaining free space 54 and then the data is written to the buffer 51. Next, the special block 53 is erased to serve as a back up block for further writing the unchanged data below the changed data in the block 52 page by page in a orderly manner according to the page number until completely filling the page, and then the original block 52 is erased to serve as a back up block, and the block 52 is replaced by the buffer 51 to repeat the above procedure.

The method of writing data to the flash memory cell of the present invention can continue writing data even when the data change is unable completely fill the page. Accordingly, the data writing speed can be increased substantially.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations in which fall within the spirit and scope of the included claims. All matters set forth herein or shown in the accompanying drawings are to be interpreted in an illustrative and non-limiting sense.

What is claimed:

1. A method of writing data to a large block of a flash memory cell, the method comprising:

picking a block from a preset back up blocks of said flash memory cell to serve as a buffer;

writing an unchanged data page by page in an orderly manner according to the page number to said buffer from a first page of said block of said flash memory cell;

judging whether a changed data in said block is sufficient to completely fill a page, then writing said data to said buffer page by page in an orderly manner according to the page number;

judging whether said changed data in said block is sufficient to completely fill a page, then randomly picking a block from said back up blocks to serve as a special block for writing the remaining data thereof;

judging whether the next set of data is a continuation of said changed data, wherein if said next set of data is not the continuation of said changed data, said data stored in said special block is read and the remaining part of said page is filled up with said data in said block for writing to said buffer, and said special block is erased to serve as a back up block, and wherein said unchanged data is written below the changed data in said block page by page in an orderly manner according the page number until completely fill up said page, and wherein the original block is erased to serve as a back up block and said block is replaced by said buffer.

2. The method according to claim 1, wherein when said next set of data is a continuation of said changed data, whether said next set of data together with said data stored in said special block is sufficient to completely fill the page is judged, wherein if yes, said data stored in said special block together with said next set of data are organized and written to said buffer and said special block is erased to serve as a back up block, and the above steps are repeated until said page is completely filled up, then said data from said special block is read and organized with said next set of data and written to said buffer, and then the special block is erased to serve as a back up block.

3. The method according to claim 2, wherein when the next set of data is a continuation of said changed data, then writing operation of said data to said buffer repeated in an orderly manner page by page until the last page of said block is completely filled, and then said original block is erased to serve as a back up block and said block is replaced by said buffer.

* * * * *